United States Patent
Hofmann

[11] 3,888,472
[45] June 10, 1975

[54] SUSPENSION INSERT FOR A TWO-HEADED RESILIENT BUSHING

[75] Inventor: A. J. Hofmann, Frankfurt, Ind.

[73] Assignee: The General Tire & Rubber Company, Akron, Ohio

[22] Filed: Apr. 25, 1974

[21] Appl. No.: 463,955

[52] U.S. Cl. .................. 267/57.1 R; 267/63 R
[51] Int. Cl. ............................................ F16f 1/38
[58] Field of Search ........ 267/57.1 R, 57.1 A, 63 R, 267/63 A

[56] References Cited
UNITED STATES PATENTS
3,147,964  9/1964  Wolf .......................... 267/57.1 A
3,202,410  8/1965  Schell ......................... 267/63 R FOREIGN PATENTS OR APPLICATIONS
732,205  2/1943  Germany ..................... 267/57.1 A Primary Examiner—James B. Marbert

[57] ABSTRACT

A suspension insert for a two-headed resilient bushing is provided with a central body part and first and second head parts axially positioned integral with the body part at opposite ends thereof. The outer periphery of the first head part is larger than the outer periphery of the central body part, and the inner periphery of the first head part is at least about as large as the inner periphery of the central body part. The outer periphery of the second head part is at least about as small as the outer periphery of the central body part, and the inner periphery of the second head part is smaller than the inner periphery of the central body part. The inner periphery of the second head part also is annularly tapered at one end to integrate with said central body part at an angle less than 50°; and the second head part has an axial body length of less than 1 inch. In addition, the volumes of the first and second head parts are at least as large as the volumes of the corresponding heads of the resilient bushing into which the suspension insert is formed under stress when assembled.

8 Claims, 6 Drawing Figures

SUSPENSION INSERT FOR A TWO-HEADED RESILIENT BUSHING

FIELD OF THE INVENTION

The present invention relates to resilient bushings which comprise inner and outer rigid members between which is inserted an elastomeric suspension insert typically under radial compression.

BACKGROUND OF THE INVENTION

In the isolation of vibration between structural components, it has become well-known to use a resilient bushing having a pair of concentric rigid metal sleeves. The inner sleeve is secured to one structural component, and the outer sleeve is secured to the other structural component. A suspension insert is concentrically positioned between the rigid sleeves typically under radial compression. Such resilient bushings are also utilized to increase the dampening of metal structures such as frames of automobiles, and to interrupt the low impedance all-metal path for the transmission of structure-borne sounds in a metal structure. Illustrative of previously known resilient bushings and machines for making such bushings are set forth in U.S. Pat. Nos. 2,749,160, 2,824,362, 2,840,893, 2,844,398, 2,858,155, 2,872,727, 2,877,543, 2,895,215, 3,082,999, 3,147,964, 3,171,699, 3,239,286, 3,380,791, 3,387,839, 3,560,034, and 3,643,320.

Originally these resilient bushings were made by inserting the uncured elastomeric suspension insert between the sleeves and thereafter relieving the internal stresses in the suspension insert during bonding and curing. To increase the load bearing capacity of the bushings, precured suspension inserts were compressibly inserted between the sleeves. It was also found that various spring rates in different radial directions could be achieved in a single bushing by providing the suspension insert with the various recesses.

To increase the load-bearing capacity of the bushing, it has been known to extend the suspension insert beyond the sleeves to form one or two heads at the ends of the bushing. The heads increase the axial spring rate in one or both directions without changing the torsional and/or radial spring rates. That is, the axial spring rate is increased without increasing the stiffness of the elastomeric insert either by the use of harder material or bonding of the elastomeric material to the rigid sleeves.

Such two-headed resilient bushings having high axial spring rates in both directions can be made by endcapping the bushing after insertion of a simple annular shaped suspension insert between the concentric sleeves. Such "self-forming" heads have been successful in increasing the axial spring rate without affecting the torsional or radial spring rates. However, such heads are limited in size because of the tendency of the insert to pull away from the inner sleeve as the size is increased. Further, such endcapping necessarily causes the heads to be placed under substantial axial compressive stress in the free state, which has been found under certain test conditions to decrease the durability and fatigue life of the resilient bushing.

It has been proposed to decrease the cost of manufacture of the two-headed bushing by forming the heads simultaneously with the insertion of the suspension insert between the sleeves. However, such manufacturing technique involves the formation of a suspension insert with heads at both ends of the member, i.e., with outer peripheries larger than the outer periphery of the body part of the member. Such suspension inserts are difficult and expensive to mold or otherwise make and, therefore, the costs saved in the one-step insertion and head formation of the bushing are substantially lost in the manufacture of the suspension insert. Further, the heads of a two-headed resilient bushing so formed are usually under axial compression.

The present invention overcomes these disadvantages and difficulties in making two-headed resilient bushings. It provides a suspension insert which can be easily molded and which provides for the making of a two-headed resilient bushing in one assembly step. Moreover, it provides for a two-headed bushing with controllable and reduced axial compression in the heads when in an externally free or unloaded state.

SUMMARY OF THE INVENTION

A suspension insert for a two-headed resilient bushing is provided which can be easily molded, and which can be inserted and incorporated into the two-headed resilient bushing in one assembly step. The suspension insert is of an elastomeric composition and has a central body part of annular shape with inner and outer peripheries. The suspension member also has first and second head parts axially positioned at opposite end portions integral with said body part.

The first head part has an outer periphery larger than the outer periphery of said central body part and has an inner periphery at least about as large as said central body part. The first head part also has a volume at least as large as the volume of a head of a two-headed resilient bushing into which the suspension insert is incorporated. Preferably the volume of the first head part is substantially equal to the volume of a head of a two-headed resilient bushing into which the suspension insert is assembled so that a head is provided substantially free of axial compressive stresses in a load-free state.

The second head part has an outer periphery at least about as small as the outer periphery of said body part and an inner periphery smaller than the inner periphery of said body part. To provide for flairing and formation of a desired head of a resilient bushing on assembly, the inner periphery is also annularly tapered at one end thereof to integrate with said body part at an angle of less than about 50° and preferably at an angle between 20° and 40°. For the same reason, the body length of the second head is less than 1 inch and preferably less than ½ inch, with ¼ inch being most typical.

The volume of the second head is also controlled so that it is at least as large as the volume of a second head of a resilient bushing into which the suspension insert is incorporated. Again, preferably the volume of the second head part is substantially equal to the volume of the second head of the resilient bushing in which the suspension insert is assembled so that the resulting head of the resilient bushing is substantially free of axial compressive stresses in an unloaded state.

Other details, objects and advantages of the invention will become apparent as the following description of the presently preferred embodiments and presently preferred methods of practicing the same proceeds.

DESCRIPTION OF THE DRAWINGS

In the accompanying drawings, the preferred embodiments and the presently preferred methods of practicing the invention are illustrated, in which.

DESCRIPTION OF THE PREFERRED EMBODIMENTS

Figure 1:
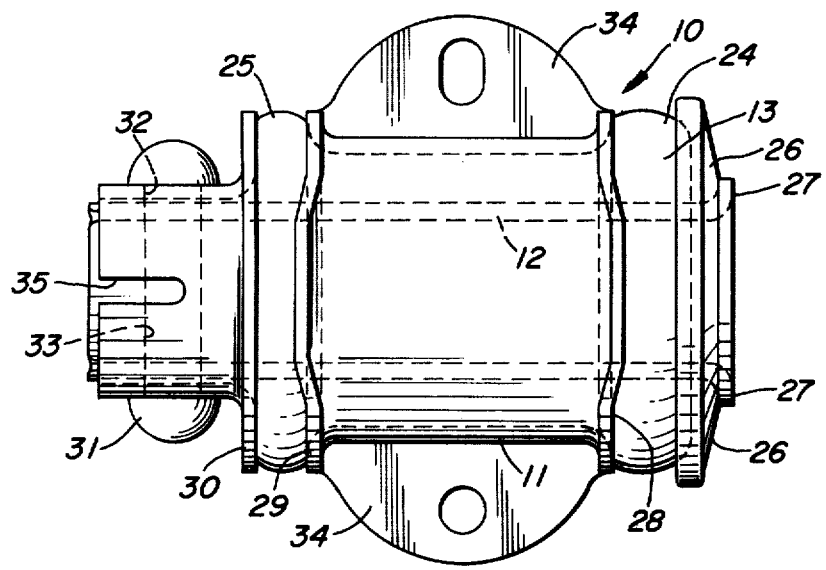
FIG. 1 is a top elevational view of a two-headed resilient bushing incorporating a suspension insert of the present invention.
Figure 2:
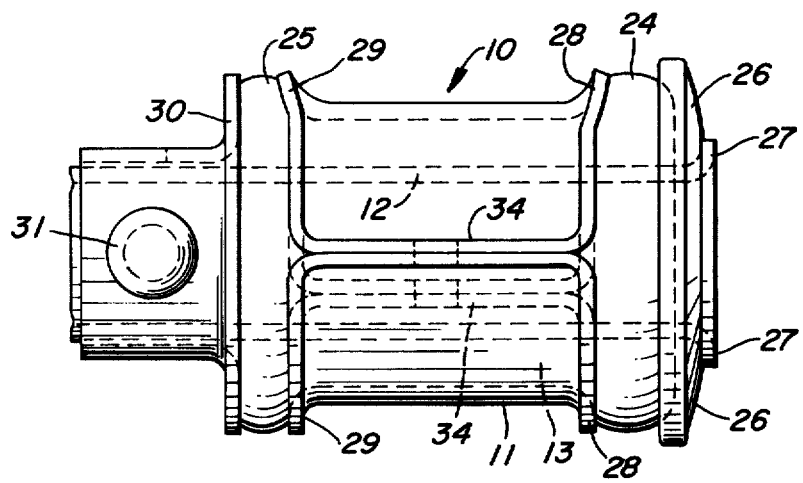
FIG. 2 is a side elevational view of the two-headed resilient bushing shown in FIG. 1.
Figure 3:
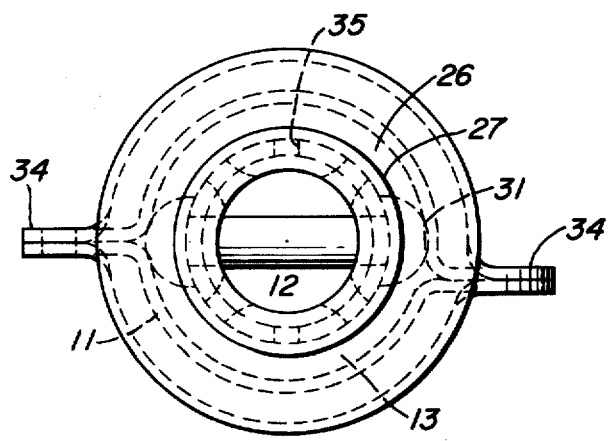
FIG. 3 is an end elevational view of the two-headed resilient bushing shown in FIG. 1.

Referring to FIGS. 1, 2 and 3, a two-headed resilient bushing 10 is shown which is suitable for use in automotive applications. Bushing 10 comprises outer rigid member 11 and inner rigid member 12. Preferably members 11 and 12 are made of a metal such as steel and are cylindrically shaped. On assembly, members 11 and 12 are preferably concentrically positioned with respect to each other.

Compressively positioned between members 11 and 12 is suspension insert 13 of the present invention. Suspension insert 13 is made of an elastomeric composition, for example, by masterbatching an elastomeric compound with suitable amounts of accelerator, modifier and plasticizing agents as well as curing agents, accelerators, antioxidants and fillers. Suitable elastomeric compounds in addition to natural rubber are synthetic elastomers such as styrene-butadiene rubber, ethylene-propylene rubber and the like that are typically filled with carbon black. The masterbatch is injection, transfer or compression molded, and thereafter cured to form the elastomeric insert. The insert typically has a Shore-A Hardness of between about 35 and 70 Durometer and most desirably of about 50 Durometer or more.

Figure 4:
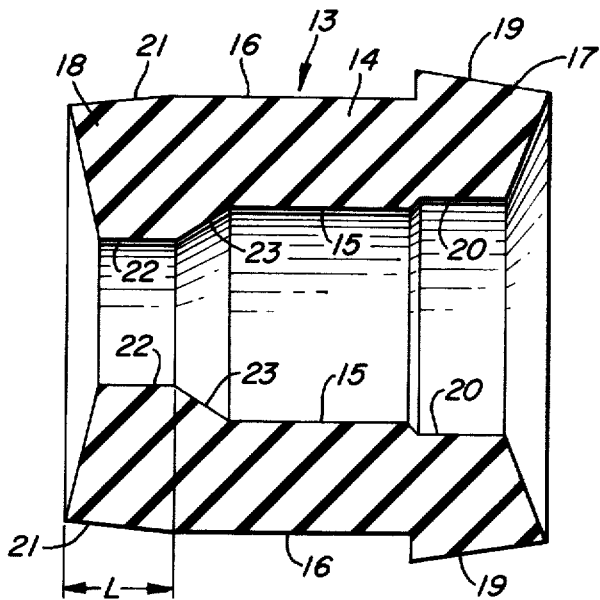
FIG. 4 is a side elevational view in cross-section of a suspension insert of the present invention prior to assembly into a resilient bushing such as shown in FIG. 1.
Figure 5:
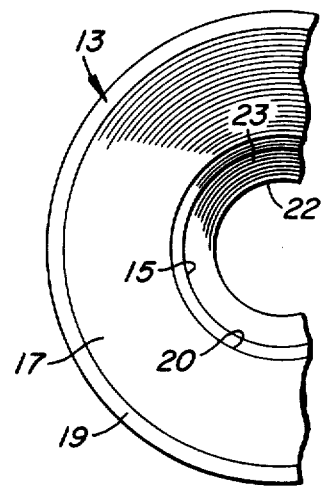
FIG. 5 is an end elevational view of the suspension insert shown in FIG. 4.

Referring to FIGS. 4 and 5, the molded suspension insert is shown prior to assembly. The suspension insert 13 of an elastomeric composition comprises central body part 14 of annular shape with inner and outer peripheries 15 and 16, respectively. The inner and outer peripheral dimensions as well as the length of body part 14 is determined by the dimensions of rigid members 11 and 12 and the elongation desired in the suspension insert when assembled into bushing 10. Typically, the suspension insert is designed to provide central body part 14 with an elongation of at least 30 percent and even up to and greater than 100 percent. The elongation determines the radial compressive stresses within the assembled suspension insert and the radial and torsional spring rates of the resilient bushing.

The suspension insert 13 also includes first and second head parts 17 and 18, respectively, at opposite axial ends of the suspension insert integral with body part 14. First head part 17 has an outer periphery 19 larger than outer periphery 16 of body part 14, and an inner periphery 20 at least about as large and preferably slightly larger than inner periphery 15 of body part 14.

Second head part 18 has an outer periphery 21 at least about as small as outer periphery 16 of body part 14, and an inner periphery smaller than the inner periphery 15 of body part 14. The inner periphery 22 of second head part 18 also has an annular taper 23 at one end thereof to integrate second head part 18 with central body part 14. The angle of the annular taper 23 is less than 50° and preferably between 20° and 40°. It is contemplated that where the annular taper 23 is greater than 50°, second head part 18 does not properly flair to form the desired head of the resilient bushing during assembly. Typically, annular taper 23 is at an angle of about 30° to provide good flairing of the head part 18 during insertion, while not overly extending the length of second head part 18. For this reason, the body length (L) of second head part 18 (i.e., the axial length of head 18 less annular taper 23) is also less than 1 inch and preferably less than ½ inch, with ¼ inch being most typical.

In addition, the volumes of first and second head parts 17 and 18 are at least as large as the volume of first and second heads 24 and 25, respectively, of the desired resilient bushing 10 into which the suspension insert is formed under stress when assembled (see FIGS. 1 and 2). Specifically, the volumes of head parts 17 and 18 are controlled to provide the desired axial compression and axial spring rates for first and second head parts 24 and 25 of the resilient bushing. If it is desired that the heads of the resilient bushing in an unloaded condition be substantially axial compression free, head parts 17 and 18 of suspension insert 13 are designed with a volume substantially equal to the volume of the heads 24 and 25 of the assembled resilient bushing. On the other hand, if it is desired that first and second head parts 24 and 25 be compressively loaded, first and second head parts 17 and 18 of the compression insert 13 will be designed with the volume substantially larger than heads 24 and 25. Thus, the axial compressive loading, or lack thereof, can be readily controlled by controlling the volume of the head parts 17 and 18 of the suspension insert 13. Further, it should be noted that the compressive forces provided in the heads 24 and 25 can be independently controlled in this manner so that different axial spring rates can be provided in different directions.

Referring again to FIGS. 1, 2 and 3, the resilient bushing is preferably assembled by first positioning outer member 11 in an upper nesting member, which is part of a vertical or horizontal assembly machine such as shown in U.S. Patent No. 2,660,780. Retaining ring 26 is then nested against flange 27 of inner member 12 and the assembly positioned on a mandrel. The mandrel is utilized to carry inner member 12 and force said inner member through the lower nesting member and the annular opening in elastomeric suspension insert 13.

On insertion, first head part 17 of suspension insert 13 is positioned between the abutting forces of retaining ring 26 and flange 28 of outer member 11. Simultaneously, second head part 18 is caused to flair and form second head part 25 in contact with flange 29 of outer member 11 and the abutting face of a retainer 30. Retainer 30 is subsequently positioned over inner member 12 against second head 25 and rivet 31 is inserted through an opening 32 in retainer 30 and an opening 33 in inner member 12 to fasten retainer 30 to inner member 12 against second head 25 of suspension insert 13.

To secure the resilient bushing for use, outer member 12 is provided with lugs 34 having openings therein, and retainer 30 is provided with slots 35. One structural component, e.g. an automobile frame, can thus be fastened to outer member 11 via lugs 34, and another structural component, e.g. a motor, can be fastened to inner member 12 via slots 35 in retainer 30.

Figure 6:
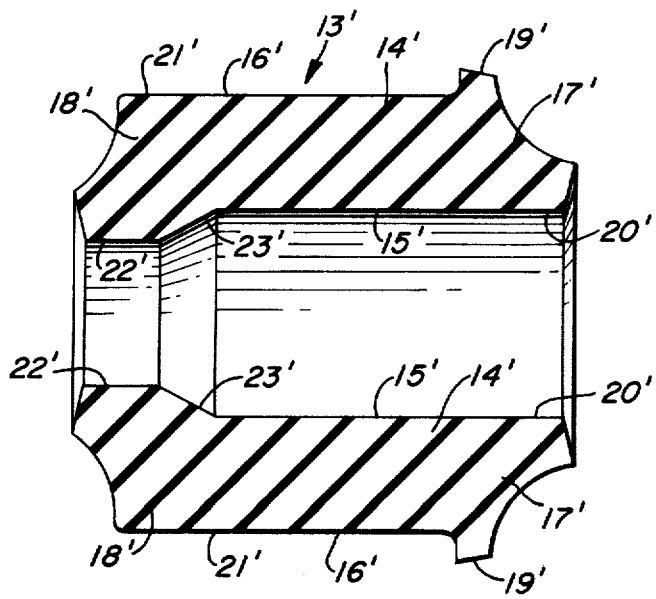
FIG. 6 is a side elevational view in cross-section of an alternative suspension insert of the present invention.

Referring to FIG. 6, an alternative suspension insert 13' is shown. Suspension insert 13' has the same parts in the same relationship as above described in connection with insert member 13. Thus, the parts have been labeled with corresponding prime numbers and further discussion of the parts and their relationships to each other is unnecessary. The only points of difference are that inner periphery 20' of first head part 17' is the same as inner periphery 15' of central body part 14' instead of larger than said inner periphery of the central body part, and that outer periphery 21' of second head part 18' is the same as outer periphery 16' of central body part 14'. Further, the configurations of first and second head parts 17' and 18' have been changed to control various stresses within the heads of the resilient bushing on assembly.

While the presently preferred embodiments of the invention and means of performing them have been specifically described, it is distinctly understood that the invention may be otherwise variously embodied and used within the scope of the following claims.

What is claimed is:

1. In a two-headed resilient bushing of the type including a rigid outer member, a rigid inner member concentrically disposed within said outer member, a first retainer member, a second retainer member, and a suspension insert including two end heads and mounted in radial compression and elongation between said inner member and said outer member with each of said heads respectively mounted between each of said retainer members and said outer member at the ends of said outer member, an improved suspension insert comprising:
   A. A suspension insert of an elastomeric composition having (i) a generally cylindrical central body part of annular shape with inner and outer peripheries and adapted to be mounted in radial compression and under at least about 30% elongation between said inner member and said outer member and, (ii) first and second end parts axially positioned at opposite ends of said body part as integral portions of said body part;
   B. said first head part having when unstressed (i) an outer periphery larger than the outer periphery of said body part, (ii) an inner periphery at least about as large as said body part, and (iii) a volume at least as large as the desired volume of a first stressed and formed head of said desired resilient bushing; and
   C. said second head part having when unstressed (i) an outer periphery at least about as small as the outer periphery of said body part, (ii) an inner periphery smaller than the inner periphery of said body parts and annularly tapered at one end thereof to integrate with the interior of said body part at an angle of less than about 50°, and (iii) a volume at least as large as the volume of a second stressed and formed head of said desired resilient bushing.

2. A suspension insert for a two-headed resilient bushing as set forth in claim 1 wherein:
   said first and second head parts of the suspension insert have volumes substantially larger than the stressed and formed heads of the desired resilient bushing, whereby the heads formed with said suspension insert are under axial compression.

3. A suspension insert for a two-headed resilient bushing as set forth in claim 1 wherein:
   said first and second head parts of the suspension insert have volumes substantially equal to the volumes of the stressed and formed heads of the desired resilient bushing, whereby the heads formed by said suspension insert are substantially axially compression free.

4. A suspension insert for a two-headed resilient bushing as set forth in claim 1 wherein:
   said second head part is annularly tapered integrate with the interior of to said body part at an angle between about 20 and 40°.

5. A suspension insert for a two-headed resilient bushing as set forth in claim 4 wherein:
   said first and second head parts of the suspension insert have volumes substantially larger than the formed heads of the desired resilient bushing, whereby the heads formed with said suspension insert are under axial compression.

6. A suspension insert for a two-headed resilient bushing as set forth in claim 4 wherein:
   said first and second head parts of the suspension insert have volumes substantially equal to the volumes of the heads of the desired resilient bushing, whereby the formed heads formed by said suspension insert are substantially axially compression free.

7. A suspension insert as set forth in claim 1 wherein said second head part has an unstressed body length of less than about 1 inch.

8. A suspension insert as set forth in claim 1 wherein said insert is comprised of an elastomer having a Shore A Hardness of between about 35 and 70 Durometer.

* * * * *